(12) United States Patent
Land, III

(10) Patent No.: US 10,330,328 B2
(45) Date of Patent: Jun. 25, 2019

(54) TEMPERATURE CONTROL SYSTEM

(71) Applicant: Trane International Inc., Piscataway, NJ (US)

(72) Inventor: Joseph George Land, III, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 230 days.

(21) Appl. No.: 13/948,000

(22) Filed: Jul. 22, 2013

(65) Prior Publication Data

US 2015/0021005 A1    Jan. 22, 2015

(51) Int. Cl.
| | |
|---|---|
| F24F 11/00 | (2018.01) |
| F24F 7/00 | (2006.01) |
| F24F 11/62 | (2018.01) |
| F24D 19/10 | (2006.01) |
| F24F 3/044 | (2006.01) |
| F24F 11/30 | (2018.01) |
| F24F 3/14 | (2006.01) |
| F24F 110/10 | (2018.01) |
| F24F 110/20 | (2018.01) |
| F24F 11/64 | (2018.01) |

(52) U.S. Cl.
CPC ..... *F24D 19/1084* (2013.01); *F24D 19/1087* (2013.01); *F24F 3/044* (2013.01); *F24F 11/30* (2018.01); *F24F 11/62* (2018.01); *F24D 2220/042* (2013.01); *F24F 3/14* (2013.01); *F24F 11/64* (2018.01); *F24F 2110/10* (2018.01); *F24F 2110/20* (2018.01); *G05B 2219/2614* (2013.01)

(58) Field of Classification Search
CPC ............... F24F 11/0001; F24F 11/0012; F24F 11/0015; F24F 11/0044; F24F 11/006; F24F 2011/0064; F24F 2011/0067; F24F 11/00; F24F 7/00; F24F 11/62
USPC ........... 165/213, 214; 236/1 B; 454/230, 239
See application file for complete search history.

(56) References Cited

U.S. PATENT DOCUMENTS

| | | | |
|---|---|---|---|
| 5,012,973 A * | 5/1991 | Dick .................. | G05D 23/1904 236/46 R |
| 5,303,767 A * | 4/1994 | Riley ............................ | 165/208 |
| 5,803,357 A | 9/1998 | Lakin | |
| 6,009,939 A | 1/2000 | Nakanishi et al. | |
| 6,688,384 B2 | 2/2004 | Eoga | |
| 7,058,477 B1 | 6/2006 | Rosen | |
| RE40,437 E | 7/2008 | Rosen | |
| 7,475,558 B2 * | 1/2009 | Perry ...................... | F24F 3/044 236/49.3 |

(Continued)

FOREIGN PATENT DOCUMENTS

WO    9607058 A1    3/1996

*Primary Examiner* — Christopher R Zerphey
*Assistant Examiner* — Harry E Arant
(74) *Attorney, Agent, or Firm* — Conley Rose, P.C.; J. Robert Brown, Jr.

(57) ABSTRACT

An HVAC system controller has at least one processor configured to monitor at least one of a first humidity and a first temperature of a first air volume sensed by a first sensor and at least one of a second humidity and a second temperature of a second air volume sensed by a second sensor, configured to calculate an environmental metric, and configured to determine whether mixing the first air volume with the second air volume can cause the environmental metric to conform to a first threshold requirement.

21 Claims, 7 Drawing Sheets

(56) References Cited

U.S. PATENT DOCUMENTS

| | | | |
|---|---|---|---|
| 8,442,694 B2* | 5/2013 | Jang | F24F 12/006 |
| | | | 700/276 |
| 8,621,884 B2* | 1/2014 | Stammer et al. | 62/409 |
| 2006/0097063 A1* | 5/2006 | Zeevi | F24F 11/0086 |
| | | | 236/49.3 |
| 2007/0045429 A1* | 3/2007 | Chapman et al. | 236/46 C |
| 2012/0071082 A1* | 3/2012 | Karamanos | F24F 5/0003 |
| | | | 454/284 |
| 2012/0216982 A1* | 8/2012 | Lee | F24F 11/001 |
| | | | 165/11.1 |

* cited by examiner

TEMPERATURE CONTROL SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some heating, ventilation, and/or air conditioning (HVAC) systems may comprise a system controller that may generally be configured to control the temperature in a structure to a selected temperature threshold. The system controller may also be configured to control the temperature in a plurality of different zones of the structure. In some instances, however, the system controller may not be configured to maximize energy efficiency.

SUMMARY

In some embodiments of the disclosure, a system controller comprising at least one processor configured to monitor (1) at least one of a first humidity and a first temperature of a first air volume sensed by a first sensor and (2) at least one of a second humidity and a second temperature of a second air volume sensed by a second sensor, configured to calculate an environmental metric, and configured to determine whether mixing the first air volume with the second air volume can cause the environmental metric to conform to a first threshold requirement is disclosed.

In other embodiments of the disclosure, an HVAC system comprising a system controller, a first sensor configured to sense at least one of a first humidity of a first air volume and a first temperature of the first air volume, and a second sensor configured to sense at least one of a second humidity of a second air volume and a second temperature of the second air volume, wherein the system controller is configured to monitor at least one of a first humidity and a first temperature of a first air volume sensed by the first sensor and at least one of a second humidity and a second temperature of a second air volume sensed by the second sensor, calculate an environmental metric, and determine whether mixing the first air volume and the second air volume can cause the environmental metric to conform to a first threshold requirement is disclosed.

In yet other embodiments of the disclosure, a method of operating an HVAC system comprising monitoring at least one of a first humidity of a first air volume sensed by a first sensor and a first temperature of the first air volume sensed by the first sensor and at least one of a second humidity of a second air volume sensed by a second sensor and a second temperature of the second air volume sensed by the second sensor, calculating an environmental metric using at least one of the first humidity and the first temperature and at least one of the second humidity and the second temperature, and determining whether mixing the first air volume and the second air volume can cause the environmental metric to conform to a first threshold requirement is disclosed.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Some heating, ventilation, and/or air conditioning (HVAC) systems measure and control temperature based on a single point sensor which may or may not reflect the need for comfort conditioning in other parts of a house or commercial building as heat load distribution changes throughout. Some zoned HVAC systems measure temperature in each zone and control the overall system and airflow balance between zones using zone supply dampers based on a simple average of the individual temperatures of each zone. Such zoned HVAC systems generally require expensive hardware to implement, and simple temperature averaging doesn't allow for the operation of a fan only to better circulate and balance air temperatures when an unbalanced demand is present. Furthermore, traditional fan circulation systems attempt to keep the air temperature balanced by running a fan on a timer control which expends fan energy when no zone is out of balance and does not extend fan time when needed to aid temperature uniformity.

In some instances, it may be desirable to provide an affordable HVAC system comprising multiple temperature sensors that is capable of maintaining desired comfort levels throughout different zones while expending minimal energy. For example, in cases where a residential structure or commercial building comprises zones requiring different comfort levels or having various thermal demands, it may be desirable to provide an HVAC system capable of mixing the air in higher temperature zones with air in lower temperature zones to achieve a desired comfort level without engaging the compressor to provide heating and/or cooling to the zone having a temperature outside a desired comfort level. In other instances, it may also be desirable to decouple fan speed from a heating or cooling demand to help circulate a higher volume of air than may be needed for a particular heat load to minimize the required heating and/or cooling needed to reach a desired comfort level in a particular zone, thus reducing energy consumption of the HVAC system. In some embodiments of the disclosure, systems and methods are disclosed that comprise providing an HVAC system controller configured to monitor multiple zone temperatures, utilize an algorithm to determine if a fan only mode may be employed to mix air between multiple zones to achieve a more balanced temperature, and control the HVAC system to achieve a more balanced temperature within the structure. In some embodiments, the HVAC system controller may also be configured as a component in an HVAC system.

Figure 1:
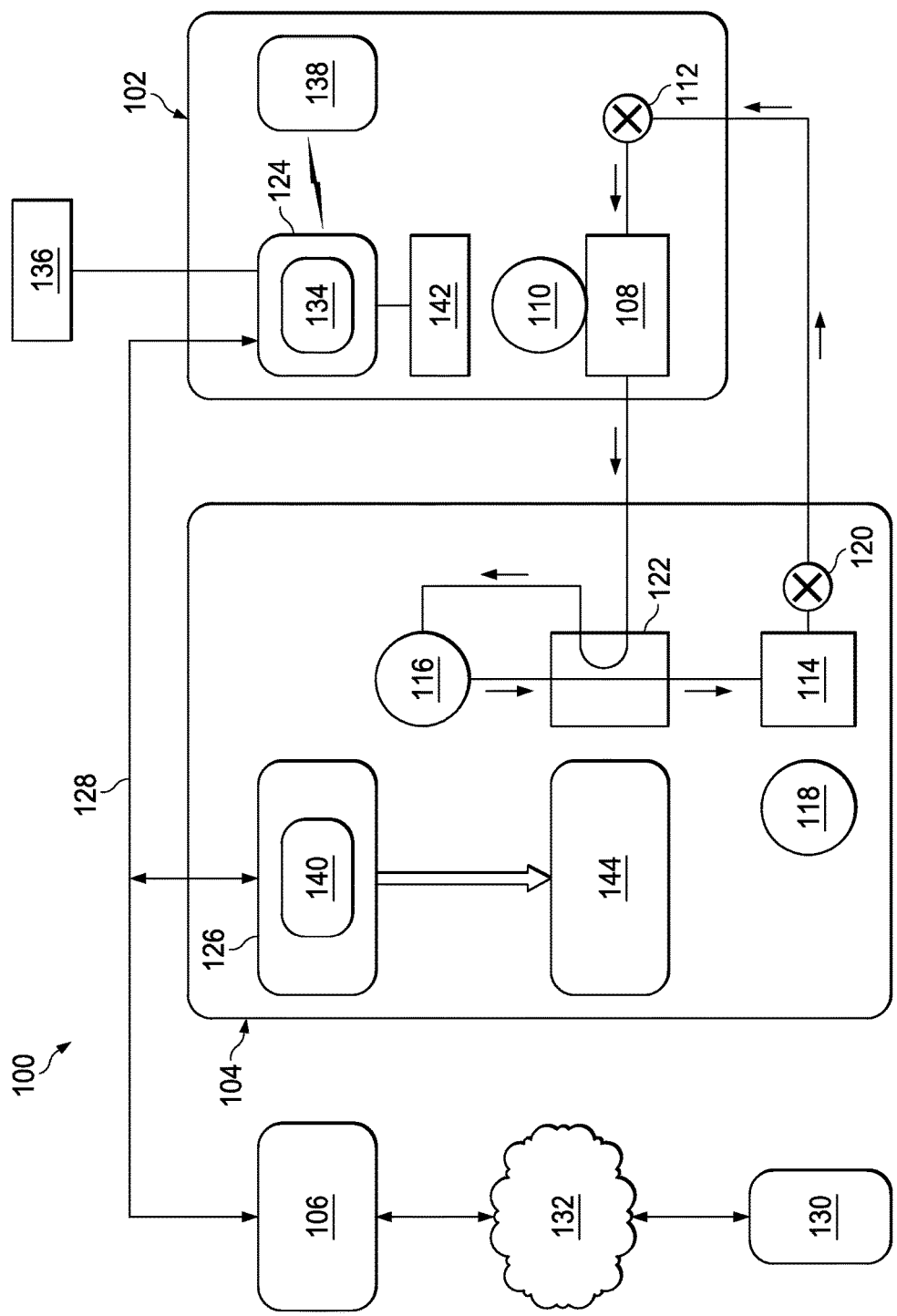
FIG. 1 is simplified schematic diagram of an HVAC system according to an embodiment of the disclosure.

Referring now to FIG. 1, a simplified schematic diagram of an HVAC system 100 is shown according to an embodiment of the disclosure. HVAC system 100 comprises an indoor unit 102, an outdoor unit 104, and a system controller 106. In some embodiments, the system controller 106 may operate to control operation of the indoor unit 102 and/or the outdoor unit 104. As shown, the HVAC system 100 is a so-called heat pump system that may be selectively operated to implement one or more substantially closed thermodynamic refrigeration cycles to provide a cooling functionality and/or a heating functionality.

Indoor unit 102 comprises an indoor heat exchanger 108, an indoor fan 110, and an electronic expansion valve (EEV) 112. Indoor heat exchanger 108 is a plate fin heat exchanger configured to allow heat exchange between refrigerant carried within internal tubing of the indoor heat exchanger 108 and fluids that contact the indoor heat exchanger 108 but that are kept segregated from the refrigerant. In other embodiments, indoor heat exchanger 108 may comprise a spine fin heat exchanger, a microchannel heat exchanger, or any other suitable type of heat exchanger.

The indoor fan 110 is a centrifugal blower comprising a blower housing, a blower impeller at least partially disposed within the blower housing, and a blower motor configured to selectively rotate the blower impeller. In other embodiments, the indoor fan 110 may comprise a mixed-flow fan and/or any other suitable type of fan. The indoor fan 110 is configured as a modulating and/or variable speed fan capable of being operated at many speeds over one or more ranges of speeds. In other embodiments, the indoor fan 110 may be configured as a multiple speed fan capable of being operated at a plurality of operating speeds by selectively electrically powering different ones of multiple electromagnetic windings of a motor of the indoor fan 110. In yet other embodiments, the indoor fan 110 may be a single speed fan.

The EEV 112 is an electronically controlled motor driven EEV. In alternative embodiments, the EEV 112 may comprise a thermostatic expansion valve, a capillary tube assembly, and/or any other suitable metering device. The EEV 112 may comprise and/or be associated with a refrigerant check valve and/or refrigerant bypass for use when a direction of refrigerant flow through the EEV 112 is such that the EEV 112 is not intended to meter or otherwise substantially restrict flow of the refrigerant through the EEV 112.

Outdoor unit 104 comprises an outdoor heat exchanger 114, a compressor 116, an outdoor fan 118, an outdoor metering device 120, and a reversing valve 122. Outdoor heat exchanger 114 is a spine fin heat exchanger configured to allow heat exchange between refrigerant carried within internal passages of the outdoor heat exchanger 114 and fluids that contact the outdoor heat exchanger 114 but that are kept segregated from the refrigerant. In other embodiments, outdoor heat exchanger 114 may comprise a plate fin heat exchanger, a microchannel heat exchanger, or any other suitable type of heat exchanger.

The compressor 116 is a multiple speed scroll type compressor configured to selectively pump refrigerant at a plurality of mass flow rates. In alternative embodiments, the compressor 116 may comprise a modulating compressor capable of operation over one or more speed ranges, a reciprocating type compressor, a single speed compressor, and/or any other suitable refrigerant compressor and/or refrigerant pump.

The outdoor fan 118 is an axial fan comprising a fan blade assembly and fan motor configured to selectively rotate the fan blade assembly. In other embodiments, the outdoor fan 118 may comprise a mixed-flow fan, a centrifugal blower, and/or any other suitable type of fan and/or blower. The outdoor fan 118 is configured as a modulating and/or variable speed fan capable of being operated at many speeds over one or more ranges of speeds. In other embodiments, the outdoor fan 118 may be configured as a multiple speed fan capable of being operated at a plurality of operating speeds by selectively electrically powering different ones of multiple electromagnetic windings of a motor of the outdoor fan 118. In yet other embodiments, the outdoor fan 118 may be a single speed fan.

The outdoor metering device 120 is a thermostatic expansion valve. In alternative embodiments, the outdoor metering device 120 may comprise an electronically controlled motor driven EEV similar to EEV 112, a capillary tube assembly, and/or any other suitable metering device. The outdoor metering device 120 may comprise and/or be associated with a refrigerant check valve and/or refrigerant bypass for use when a direction of refrigerant flow through the outdoor metering device 120 is such that the outdoor metering device 120 is not intended to meter or otherwise substantially restrict flow of the refrigerant through the outdoor metering device 120.

The reversing valve 122 is a so-called four-way reversing valve. The reversing valve 122 may be selectively controlled to alter a flow path of refrigerant in the HVAC system 100 as described in greater detail below. The reversing valve 122 may comprise an electrical solenoid or other device configured to selectively move a component of the reversing valve 122 between operational positions.

The system controller 106 may comprise a touchscreen interface for displaying information and for receiving user inputs. The system controller 106 may display information related to the operation of the HVAC system 100 and may receive user inputs related to operation of the HVAC system 100. However, the system controller 106 may further be operable to display information and receive user inputs tangentially and/or unrelated to operation of the HVAC system 100. In some embodiments, the system controller 106 may not comprise a display and may derive all information from inputs from remote sensors and remote configuration tools. In some embodiments, the system controller 106 may comprise a temperature sensor and may further be configured to control heating and/or cooling of zones associated with the HVAC system 100. In some embodiments, the system controller 106 may be configured as a thermostat for controlling supply of conditioned air to zones associated with the HVAC system 100.

In some embodiments, the system controller 106 may selectively communicate with an indoor controller 124 of the indoor unit 102, with an outdoor controller 126 of the outdoor unit 104, and/or with other components of the HVAC system 100. In some embodiments, the system controller 106 may be configured for selective bidirectional communication over a communication bus 128. In some embodiments, portions of the communication bus 128 may comprise a three-wire connection suitable for communicating messages between the system controller 106 and one or more of the HVAC system 100 components configured for interfacing with the communication bus 128. Still further, the system controller 106 may be configured to selectively communicate with HVAC system 100 components and/or other device 130 via a communication network 132. In some embodiments, the communication network 132 may comprise a telephone network and the other device 130 may comprise a telephone. In some embodiments, the communication network 132 may comprise the Internet and the other device 130 may comprise a so-called smartphone and/or other Internet enabled mobile telecommunication device. In other embodiments, the communication network 132 may also comprise a remote server.

The indoor controller 124 may be carried by the indoor unit 102 and may be configured to receive information inputs, transmit information outputs, and otherwise communicate with the system controller 106, the outdoor controller 126, and/or any other device via the communication bus 128 and/or any other suitable medium of communication. In some embodiments, the indoor controller 124 may be configured to communicate with an indoor personality module 134, receive information related to a speed of the indoor fan 110, transmit a control output to an electric heat relay, transmit information regarding an indoor fan 110 volumetric flow-rate, communicate with and/or otherwise affect control over an air cleaner 136, and communicate with an indoor EEV controller 138. In some embodiments, the indoor controller 124 may be configured to communicate with an indoor fan controller 142 and/or otherwise affect control over operation of the indoor fan 110. In some embodiments, the indoor personality module 134 may comprise information related to the identification and/or operation of the indoor unit 102 and/or a position of the outdoor metering device 120.

In some embodiments, the indoor EEV controller 138 may be configured to receive information regarding temperatures and/or pressures of the refrigerant in the indoor unit 102. More specifically, the indoor EEV controller 138 may be configured to receive information regarding temperatures and pressures of refrigerant entering, exiting, and/or within the indoor heat exchanger 108. Further, the indoor EEV controller 138 may be configured to communicate with the EEV 112 and/or otherwise affect control over the EEV 112.

The outdoor controller 126 may be carried by the outdoor unit 104 and may be configured to receive information inputs, transmit information outputs, and otherwise communicate with the system controller 106, the indoor controller 124, and/or any other device via the communication bus 128 and/or any other suitable medium of communication. In some embodiments, the outdoor controller 126 may be configured to communicate with an outdoor personality module 140 that may comprise information related to the identification and/or operation of the outdoor unit 104. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the outdoor fan 118, a compressor sump heater, a solenoid of the reversing valve 122, a relay associated with adjusting and/or monitoring a refrigerant charge of the HVAC system 100, a position of the EEV 112, and/or a position of the outdoor metering device 120. The outdoor controller 126 may further be configured to communicate with a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may flow from the outdoor heat exchanger 114 to the EEV 112 through and/or around the outdoor metering device 120 which does not substantially impede flow of the refrigerant in the cooling mode. The EEV 112 may meter passage of the refrigerant through the EEV 112 so that the refrigerant downstream of the EEV 112 is at a lower pressure than the refrigerant upstream of the EEV 112. The pressure differential across the EEV 112 allows the refrigerant downstream of the EEV 112 to expand and/or at least partially convert to a two-phase (vapor and gas) mixture. The two phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108, and causing evaporation of the liquid portion of the two phase mixture. The refrigerant may thereafter re-enter the compressor 116 after passing through the reversing valve 122.

To operate the HVAC system 100 in the so-called heating mode, the reversing valve 122 may be controlled to alter the flow path of the refrigerant, the EEV 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the EEV 112, the refrigerant may experience a pressure differential across the outdoor metering device 120, the refrigerant may pass through the outdoor heat exchanger 114, and the refrigerant may reenter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
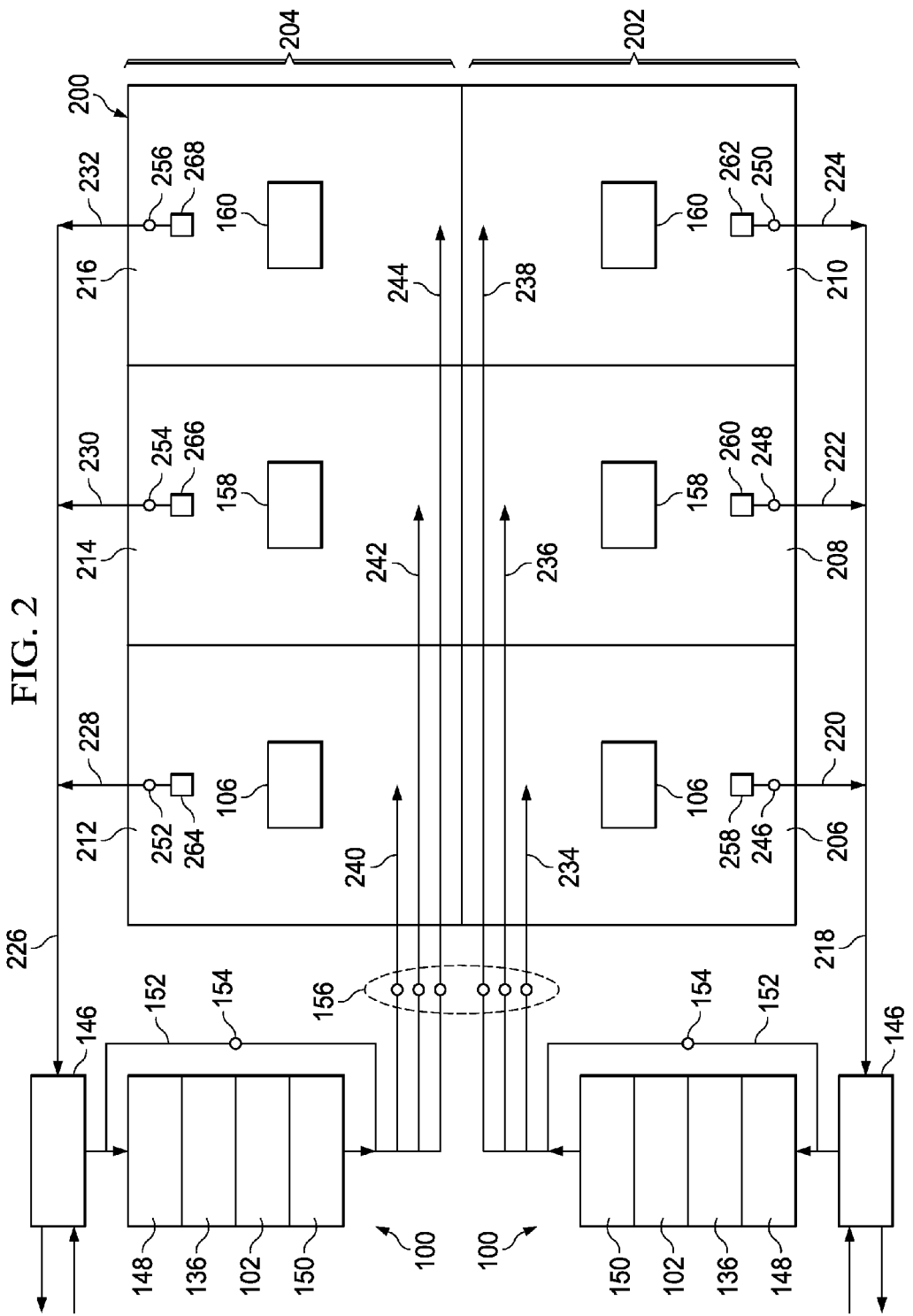
FIG. 2 is a simplified schematic diagram of the air circulation paths of the HVAC system of FIG. 1.

Referring now to FIG. 2, a simplified schematic diagram of the air circulation paths for a structure 200 conditioned by two HVAC systems 100 is shown. In this embodiment, the structure 200 is conceptualized as comprising a lower floor 202 and an upper floor 204. The lower floor 202 comprises zones 206, 208, and 210 while the upper floor 204 comprises zones 212, 214, and 216. The HVAC system 100 associated with the lower floor 202 is configured to circulate and/or condition air of lower zones 206, 208, and 210 while the HVAC system 100 associated with the upper floor 204 is configured to circulate and/or condition air of upper zones 212, 214, and 216.

In addition to the components of HVAC system 100 described above, in this embodiment, each HVAC system 100 further comprises a ventilator 146, a prefilter 148, a humidifier 150, and a bypass duct 152. The ventilator 146 may be operated to selectively exhaust circulating air to the environment and/or introduce environmental air into the circulating air. The prefilter 148 may generally comprise a filter media selected to catch and/or retain relatively large particulate matter prior to air exiting the prefilter 148 and entering the air cleaner 136. The humidifier 150 may be operated to adjust a humidity of the circulating air. The bypass duct 152 may be utilized to regulate air pressures within the ducts that form the circulating air flow paths. In some embodiments, air flow through each bypass duct 152 may be selectively regulated by each respective bypass damper 154, while air flow delivered to each of zones 206, 208, 210, 212, 214, and 216 through air supply ducts 234, 236, 238, 240, 242, and 244, respectively, may be selectively regulated by corresponding optional zone dampers 156. In some embodiments, return air flow to lower zone return plenum 218 may flow through return ducts 220, 222, and 224 and may be selectively regulated by return dampers 246, 248, and 250, respectively. In some embodiments, return air flow to upper zone return plenum 226 may flow through return ducts 228, 230, and 232 and may be selectively regulated by return dampers 252, 254, and 256, respectively. In other embodiments, return air through return ducts 220, 222, 224, 228, 230, and 232 may be selectively aided by controllable, variable speed return fans 258, 260, 262, 264, 266, and 268, respectively.

Each HVAC system 100 may also further comprise a zone thermostat 158 and a zone sensor 160. In some embodiments, a zone thermostat 158 may communicate with the system controller 106 and may allow a user to control a temperature, humidity, and/or other environmental setting for the zone in which the zone thermostat 158 is located. Further, the zone thermostat 158 may communicate with the system controller 106 to provide temperature, humidity, and/or other environmental feedback regarding the zone in which the zone thermostat 158 is located. In some embodiments, a zone sensor 160 may also communicate with the system controller 106 to provide temperature, humidity, and/or other environmental feedback regarding the zone in which the zone sensor 160 is located. In addition, in some embodiments, the system controller 106 may also monitor temperature, humidity, and/or other environmental settings for the zone in which the system controller 106 is located.

In some embodiments, the system controllers 106 may be configured for bidirectional communication with each other and may further be configured so that a user may, using any of the system controllers 106, monitor and/or control any of the HVAC system 100 components regardless of which zones the components may be associated with. Further, each system controller 106, each zone thermostat 158, and each zone sensor 160 may comprise a humidity sensor and/or a temperature sensor. As such, it will be appreciated that structure 200 is equipped with a plurality of humidity sensors and/or a plurality of temperature sensors in a plurality of different locations. Accordingly, each system controller 106, zone thermostat 158, and zone sensor 160 may comprise a wired or wireless connection depending on the configuration of the HVAC system 100. In some embodiments, a user may effectively select which of the plurality of humidity sensors and/or plurality of temperature sensors is used to control operation of one or more of the HVAC systems 100.

While HVAC systems 100 are shown as a so-called split system comprising an indoor unit 102 located separately from the outdoor unit 104, alternative embodiments of an HVAC system 100 may comprise a so-called package system in which one or more of the components of the indoor unit 102 and one or more of the components of the outdoor unit 104 are carried together in a common housing or package. The HVAC system 100 is shown as a so-called ducted system where the indoor unit 102 is remotely located from the conditioned zones, thereby requiring air ducts 234, 236, 238, 240, 242, and 244 to route the circulating air.

Figure 3:
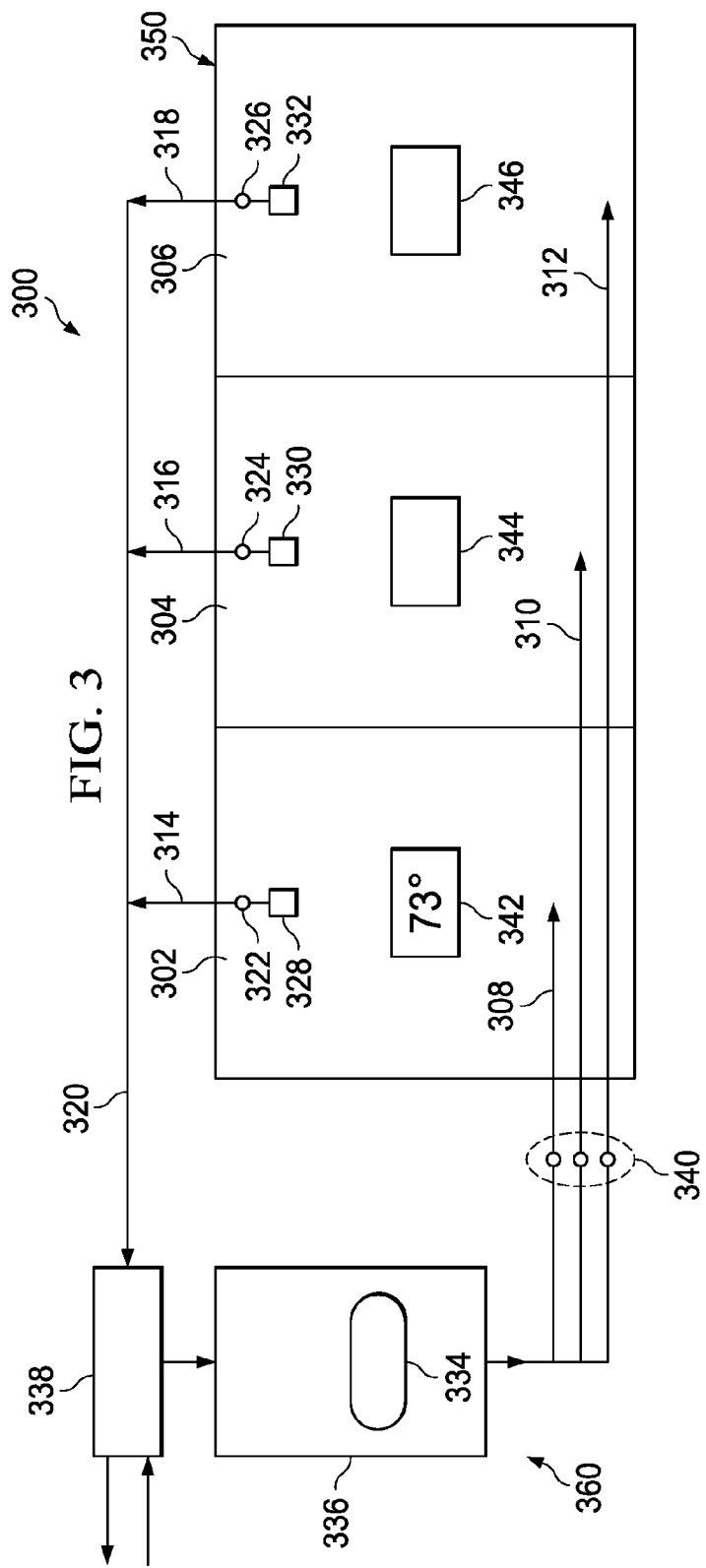
FIG. 3 is a simplified schematic of a control system comprising a selected global temperature threshold according to an embodiment of the disclosure.

Referring now to FIG. 3, a simplified schematic of a control system 300 comprising a selected global temperature threshold is shown according to an embodiment of the disclosure. Control system 300 comprises a structure 350 and an HVAC system 360. It should be noted that structure 350 is substantially similar to upper floor 204 of structure 200 in FIG. 2. Structure 350 comprises a first zone 302, a second zone 304, and a third zone 306. It should also be noted that HVAC system 360 is substantially similar to HVAC system 100 in FIG. 1. HVAC system 360 comprises a first zone supply duct 308, a second zone supply duct 310, a third zone supply duct 312, a first zone return duct 314, a second zone return duct 316, a third zone return duct 318, a return plenum 320, a first zone return damper 322, a second zone return damper 324, a third zone return damper 326, a first zone return fan 328, a second zone return fan 330, a third zone return fan 332, an indoor fan 334, an indoor unit 336, a ventilator 338, zone dampers 340, a system controller 342, a second zone temperature sensor 344, and a third zone temperature sensor 346.

In some embodiments, control system 300 may generally be controlled based on a selectable global temperature threshold for all zones 302, 304, and 306. For example, control system 300 may generally have a global temperature threshold of 73 degrees Fahrenheit in a selectable cooling mode. This temperature threshold may generally be programmed into the system controller 342 by a user. The system controller 342 may generally be configured to monitor the temperature of individual zones 302, 304, and 306 through the use of the system controller 342, a second zone temperature sensor 344, and a third zone temperature sensor 346, respectively. In some embodiments, the global temperature threshold of the control system 300 may generally be selected and/or adjusted through the system controller 342 or any of the zone temperature sensors 344, 346. Additionally, in some embodiments, each system controller 342 and/or zone temperature sensor 344, 346 may display the respective temperature of the zone in which the component is located. In other embodiments, each system controller 342 and/or zone temperature sensor 344, 346 may also display the selected global temperature threshold associated with the control system 300. It will also be appreciated by one of ordinary skill in the art that any of the system controller 342 or zone temperature sensors 344, 346 may be interchanged with one another or may comprise a zone thermostat 158 as shown in FIG. 1, and the disclosure should not be limited to any one embodiment or configuration. Furthermore, it will be appreciated that in some embodiments, any of the system controller 342 and zone temperature sensors 344, 346 may comprise a humidity sensor. In other embodiments, any of the system controller 342 and zone temperature sensors 344, 346 may comprise a mixture of temperature sensors and humidity sensors, where both temperature and humidity are considered against a prescribed thermal comfort envelope such as from ASHRAE Standard 55. In alternative embodiments, any of the system controller 342 and zone temperature sensors 344, 346 may comprise a sensor configured to detect any environmental variable or matter which may be redistributed through circulating air.

In some embodiments, the system controller 342 may also generally be configured to control the temperature of zones 302, 304, and 306 to alternate selected global temperature thresholds based on a configurable schedule contained within the system controller 342. For example, the control system 300 may have a selected global temperature threshold of 73 degrees Fahrenheit and automatically configure to maintain a selected global temperature threshold of 76 degrees Fahrenheit between the hours of 8 a.m. to 5 p.m. In other embodiments, the system controller 342 may also be configured to only run a particular schedule on certain days, i.e. only Monday through Friday. In yet other embodiments, the system controller 342 may be configured to ignore the temperature in any of the zones 302, 304, and 306 during certain times of the day or week. In alternative embodiments, the system controller 342 may also be configured to run a certain program when any of the zones 302, 304, and 306 are occupied, which may be detectable using any of motion, light, radio frequency, and/or heat detection sensors that may be in communication with the system controller 342 and/or the zone temperature sensors 344, 346. In some embodiments, the configurable schedule may be selectively configured by a user using any of the system controller 342 and/or zone temperature sensors 344, 346.

Still referring to FIG. 3, during operation, the system controller 342 communicates with the zone temperature sensors 344, 346 to determine if any zone 302, 304, and 306 is above the selected global temperature threshold (when operating in a cooling mode). If any one of the system controller 342 and zone temperature sensors 344, 346 reports a temperature that is above the selected global temperature threshold for any of the respective zones 302, 304, and 306, the system controller 342 determines if an indoor fan 334 of the HVAC system 360 may be operated in a "FAN ONLY" mode to mix the air to better equalize the temperatures of the zones 302, 304, and 306, and thereby bring the unbalanced zone's temperature below the selected global temperature threshold. In this and in other embodiments, the term "unbalanced zone" should be understood to describe a zone that has an air temperature which is not in conformance with the selected global temperature threshold specified for the control system 300 and/or is not in conformance with a selected individual temperature threshold specified for that particular zone. In determining whether the "FAN ONLY" mode may better equalize temperatures in the zones 302, 304, and 306, the system controller 342 utilizes an algorithm that compares the average temperature of the zones 302, 304, and 306 to that of the selected global temperature threshold. If the average temperature of zones 302, 304, and 306 falls below the selected global temperature threshold, the indoor fan 334 will be operated to mix the air in the zones 302, 304, and 306 to bring the unbalanced zone's temperature below the selected global temperature threshold.

For example, in a cooling mode, control system 300 may generally have a selected global temperature threshold of 73 degrees Fahrenheit. If the temperatures of zones 302, 304, and 306 are 74 degrees, 73 degrees, and 71 degrees Fahrenheit, respectively, zone 302 would be reported as having a temperature that exceeded the selected global temperature threshold of 73 degrees. The system controller 342 would calculate the average of the three zones 302, 304, and 306 to determine if mixing the air would reduce the temperature of the unbalanced zone below the selected global temperature threshold. In this example, the average temperature of zones 302, 304, and 306 is 72.67 degrees Fahrenheit. Because mixing the air within the zones 302, 304, and 306 would result in a temperature of 72.67 degrees and bring the temperature of the unbalanced zone below the selected global temperature threshold of 73 degrees, the indoor fan 334 of the HVAC system 360 would be operated in a "FAN ONLY" mode to mix the air within the three zones 302, 304, and 306. In some embodiments, the indoor fan 334 may be operated until the average temperature is reached within each of the zones 302, 304, and 306. In other embodiments, the indoor fan 334 may be operated until the unbalanced zone either reaches or falls below the temperature threshold.

In yet other embodiments, the system controller 342 may be configured to operate the indoor fan 334 for a specified time limit before initiating cooling. Thus, if mixing the air between zones 302, 304, and 306 does not bring an unbalanced zone into conformance with the temperature threshold after mixing for a set time limit, the system controller 342 may initiate cooling to more rapidly achieve conformance with the selected global temperature threshold and/or a specified comfort level. The time limit may generally be stored within the system controller 342. In some embodiments, the time limit may be entered using at least one of the system controller 342 and zone temperature sensors 344, 346. In some embodiments, the time limit may be based on a preference received by the system controller 342. In other embodiments, the time limit may be based on the rate of change of the temperature by extrapolating an estimated time to achieve the target. In yet other embodiments, the time limit may be built into the system controller 342. It should be noted that in some embodiments, the indoor fan 334 may generally be operated only when one of the zones 302, 304, and 306 exceeds the selected global temperature threshold. This configuration of the control system 300 takes advantage of already cooled air and allows for mixing air of cooler zones with air of warmer zones to achieve more balanced temperatures in the zones 302, 304, and 306 of the structure 350, thereby maximizing comfort without adding additional unnecessary cooling and maximizing the efficiency of the HVAC system 360. Therefore, running the indoor fan 334 on a timed schedule, even when zones 302, 304, and 306 may all be within the selected temperature threshold, is eliminated. It should also be noted that the indoor fan 334 may be operated at different speeds based on various factors, including, but not limited to the volume of zones 302, 304, and 306, the temperature difference between zones 302, 304, and 306, or the amount of mixing necessary to bring the unbalanced zone within the selected global temperature threshold. In addition, zones 302, 304, and 306 may also be equipped with zone return fans 328, 330, and 332, respectively, which may be selectively operated to aid in mixing between zones 302, 304, and 306.

In some embodiments, the system controller 342 may be configured to operate the "FAN ONLY" mode by mixing air between less than all of zones 302, 304, and 306 to bring an unbalanced room within the selected global temperature threshold. To achieve selective zone mixing, the system controller 342 may be configured to control return zone dampers 322, 324, and 326 associated with zones 302, 304, and 306, respectively. Alternatively or in conjunction with the control of the return zone dampers 322, 324, and 326, in some embodiments, the system controller 342 may also control respective zone dampers 340 to reduce and/or prevent mixing in selected zones. Mixing air from less than all of the zones 302, 304, and 306 may prove beneficial where mixing all of zones 302, 304, and 306 may not bring the unbalanced room within the selected global temperature threshold, but where mixing a few selected zones may bring the unbalanced room within the selected global temperature threshold. It may also be desirable to mix less than all of the zones 302, 304, and 306 to bring an unbalanced room within the selected global temperature threshold within a shorter period of time. In some embodiments, the system controller 342 may be configured to determine when mixing less than all of the zones 302, 304, and 306 is possible to bring any unbalanced zone within the selected global temperature threshold. Additionally, in other embodiments, the system controller 342 may also be configured to determine if mixing the air in less than all of the zones 302, 304, and 306 may result in operating an indoor fan 334 for a shorter amount of time.

In the aforementioned example, where zones 302, 304, and 306 have temperatures of 74 degrees, 73 degrees, and 71 degrees Fahrenheit, it may prove beneficial to mix only the first zone 302 and third zone 306. In some embodiments, the system controller 342 may calculate the average temperature of the unbalanced zone with the two remaining zones to determine if less than all of the zones 302, 304, and 306 may be employed in the "FAN ONLY" mode. For example, the system controller 342 may determine the average of the first zone 302 and the third zone 306, resulting in 72.5 degrees and the average of the first zone 302 and the second zone 304, resulting in 73.5 degrees. The system controller 342 may then be configured to determine that zone 302 and zone 306 may be employed in the "FAN ONLY" mode to mix the air in these zones, thereby bringing the unbalanced zone within the selected global temperature threshold. In some embodiments, the system controller 342 may be configured to at least partially close the return damper 324 of the second zone 304 to reduce mixing of the second zone, thereby only mixing the air from first zone 302 and third zone 306.

Again, in some embodiments, the system controller 342 may operate the indoor fan 334 until the average temperature is reached within each of the zones 302, 306 that are being mixed. In other embodiments, the indoor fan 334 may also be operated until the unbalanced zone either reaches or drops below the selected global temperature threshold. In yet other embodiments, the system controller 342 may also be configured to operate the indoor fan 334 for a specified time limit before initiating cooling. Thus, if mixing the air between zones 302 and 306 does not bring an unbalanced zone within the temperature threshold after mixing for a set time limit, the system controller 342 may initiate cooling to more rapidly achieve a specified comfort level. Again, it should also be noted that the indoor fan 334 may be operated at different speeds based on various factors, including, but not limited to the volume of zones being mixed, the temperature difference between zones, the size of the zones to be mixed, and/or the amount of mixing necessary to bring the unbalanced zone within the selected global temperature threshold. In addition, zones 302, 304, and 306 may also be equipped with zone return fans 328, 330, and 332, respectively, which may be selectively operated to aid in mixing between any of zones 302, 304, and 306.

In situations where the system controller 342 determines that the average temperature of all of the zones 302, 304, and 306 or that the average temperature of the unbalanced zone with any of the remaining zones is above the selected temperature threshold such that the "FAN ONLY" mode may not be employed to mix air between any of the zones to bring the unbalanced zone into conformance with the selected global temperature threshold, it may be necessary to initiate cooling. For example, where the selected global temperature threshold is 73 degrees Fahrenheit and zones 302, 304, and 306 have temperatures of 76, 73, and 72, the average temperature of zones 302, 304, and 306 is 73.67 degrees, the average temperature of the first zone 302 and the second zone 304 is 74.5 degrees, and the average temperature of the first zone 302 and the third zone 306 is 74 degrees. Accordingly, the system controller 342 would be configured to determine that mixing air between the unbalanced first zone 302 with any or all of zones 304 and 306 would not result in bringing the unbalanced first zone 302 into conformance with the selected global temperature threshold of 73 degrees Fahrenheit. Therefore, in this instance, the system controller 342 would initiate cooling. In this and in other embodiments, the fan speed may be decoupled from the heating/cooling demand to help circulate air at a higher volume than required for the particular heat load. In some embodiments, the indoor fan 334 may be run at a high speed while only a small amount of cooling is needed. In other embodiments, the system controller 342 may be configured to add cooling for a limited time, and then utilize the indoor fan 334 to mix zones 302, 304, and 306 to achieve temperatures in all zones 302, 304, and 306 in conformance with the selected global temperature threshold. In yet other embodiments, the system controller 342 may selectively control return dampers 322, 324, and 326 to selectively reduce the mixing of particular zones. In some embodiments, the system controller 342 may also operate return fans 328, 330, and 332 to aid in mixing between zones 302, 304, and 306.

In alternative embodiments, the system controller 342 may employ a trigger threshold that is higher than the selected global temperature threshold. The trigger threshold may represent a set point deviation at which action by the system controller 342 occurs. For example, where the selected global temperature threshold is 73 degrees Fahrenheit and the trigger threshold is +2 degrees, the system controller 342 would not initiate action until the air temperature in one of the zones 302, 304, and 306 reached 75 degrees. In some embodiments, the action taken by the system controller 342 when one of the zones 302, 304, and 306 exceeds the trigger threshold may be determining if mixing the air of any of zones 302, 304, and 306 would result in achieving an average temperature below the selected global temperature threshold. In other embodiments, the trigger threshold may represent the set point that the temperature of any of the zones 302, 304, and 306 must achieve before the system controller 342 initiates cooling. In yet other embodiments, the trigger threshold may represent the set point that the average temperature of the zones 302, 304, and 306 must achieve before the system controller 342 initiates either mixing and/or cooling. In some embodiments, the trigger threshold may be built in to the system controller 342. In other embodiments, the trigger threshold may be selectively input to the system controller 342 by the user using any of the system controller 342 and/or zone temperature sensors 344, 346.

It should be noted that although embodiments and examples are provided in the context of cooling, the control system 300 may also be configured to operate in a heating mode in any of the above-mentioned embodiments. In a heating mode, the system controller 342 may be configured to maintain a selected global temperature threshold and monitor zones 302, 304, and 306 for any temperature that drops below the selected global temperature threshold. Additionally, the control system 300 may also be configured to operate in an "AUTO" mode, which allows a user to select two global temperature thresholds via the system controller 342, in which one temperature threshold is set for a cooling mode and the other temperature threshold is set for a heating mode. In some embodiments, the two global temperature thresholds may also be selected or adjusted using any of the zone temperature sensors 344, 346. For example, if 73 degrees was selected as the cooling temperature threshold and 67 degrees was selected as the heating temperature threshold, the system controller 342 would take no action when zones 302, 304, and 306 remained at any temperature substantially between the two temperature thresholds. When any temperature of one of the zones 302, 304, and 306 exceeded 73 degrees or dropped below 67 degrees, the system controller 342 would determine if mixing the air by operating the indoor fan 334 in the "FAN ONLY" mode would bring the unbalanced zone within the selected global temperature threshold range. If the system controller 342 determined that none of zones 302, 304, and 306 could be mixed accordingly to bring the unbalanced zone within the selected global temperature threshold range, the system controller 342 would initiate heating or cooling as required. Thus, in the example, any average of less than or all of zones 302, 304, and 306 above 73 degrees Fahrenheit would require cooling, and any average of less than or all of zones 302, 304, and 306 below 67 degrees Fahrenheit would require heating. It will also be appreciated that a trigger threshold may also be employed in either the heating mode or the auto mode.

Figure 4:
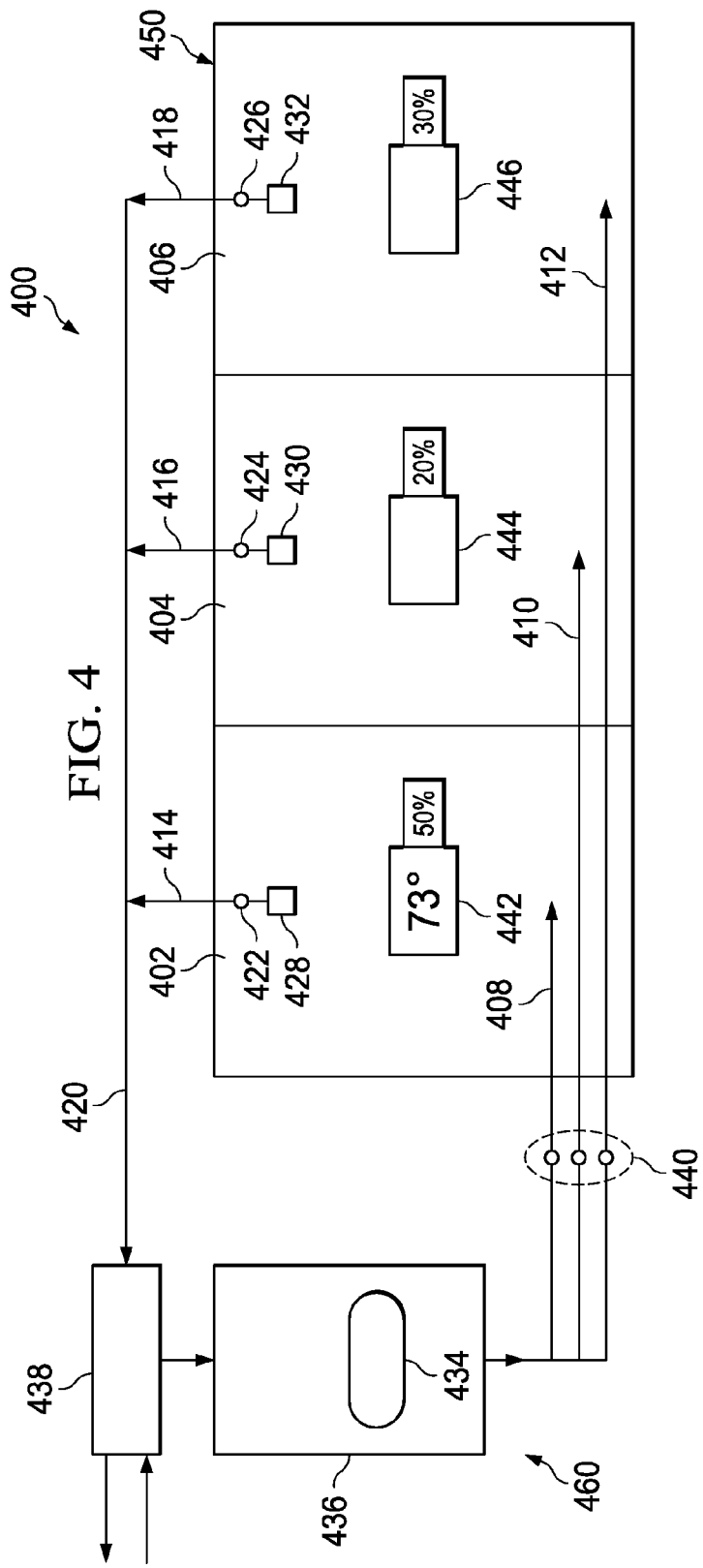
FIG. 4 is a simplified schematic of a control system comprising a selected global temperature threshold and various weighting factors for each zone according to an embodiment of the disclosure.

Referring now to FIG. 4, a simplified schematic of a control system 400 comprising a selected global temperature threshold and various weighting factors for each zone 402, 404, and 406 is shown according to an embodiment of the disclosure. It should be noted that control system 400 is substantially similar to control system 300 in FIG. 3. Control system 400 comprises a structure 450 and an HVAC system 460. It will be appreciated that structure 450 is substantially similar to structure 350 in FIG. 3. Structure 450 comprises a first zone 402, a second zone 404, and a third zone 406. It will also be appreciated that HVAC system 460 is substantially similar to HVAC system 360 in FIG. 3. HVAC system 460 comprises a first zone supply duct 408, a second zone supply duct 410, a third zone supply duct 412, a first zone return duct 414, a second zone return duct 416, a third zone return duct 418, a return plenum 420, a first zone return damper 422, a second zone return damper 424, a third zone return damper 426, a first zone return fan 428, a second zone return fan 430, a third zone return fan 432, an indoor fan 434, an indoor unit 436, a ventilator 438, zone dampers 440, a system controller 442, second zone temperature sensor 444, and third zone temperature sensor 446. It will also be appreciated that the operation of control system 400 is substantially similar to the operation of control system 300 in FIG. 3. However, control system 400 associates various weighting factors to each zone 402, 404, and 406 to determine a weighted average temperature used by the system controller 442 to determine if the "FAN ONLY" mode may be employed to better equalize temperatures and/or bring an unbalanced zone into conformance with the selected global temperature threshold.

In some embodiments, control system 400 may generally be controlled based on a selected global temperature threshold and various weighting factors for each zone 402, 404, and 406. For example, control system 400 may generally have a selected global temperature threshold of 73 degrees Fahrenheit in a selectable cooling mode. However, instead of determining a straight average of the temperatures of zones 402, 404, and 406, a weighting factor is applied to the temperature of each zone 402, 404, and 406 to determine the weighted average temperature. For example, zones 402, 404, and 406 may have weighting factors of 50%, 20%, and 30%, respectively. In some embodiments, the weighting factors applied to each zone 402, 404, and 406 may be based on each zone's volume. In other embodiments, the weighting factor applied to each zone 402, 404, and 406 may be based on considerations such as the thermal load present within a particular zone, including, but not limited to, heat-producing electronics, quantity of room occupants, or the solar loading profile of particular zones. In yet other embodiments, the weighting factors may be determined as a matter of preference by the occupants. Still in other embodiments, the weighting factors may be built into the system controller 442 based on the characteristics of the control system 400, the structure 450, and/or the HVAC system 460.

In some embodiments, the selected global temperature threshold and weighting factors of the control system 400 may generally be selected and/or adjusted through any of the zone temperature sensors 444, 446 in addition to the system controller 442. Additionally, in some embodiments, each system controller 442 and/or zone temperature sensor 444, 446 may display the respective temperature of the zone in which it is located. In addition, each system controller 442 and/or zone temperature sensor 444, 446 may also display the selected global temperature threshold associated with the control system 400. It will also be appreciated that any of the system controller 442 or zone temperature sensors 444, 446 may be interchanged with one another or may comprise a zone thermostat 158, and the disclosure should not be limited to any one embodiment or configuration. Furthermore, it will be appreciated that in some embodiments, any of the system controller 442 and zone temperature sensors 444, 446 may comprise a humidity sensor. In other embodiments, any of the system controller 442 and zone temperature sensors 444, 446 may comprise a mixture of temperature sensors and humidity sensors, where both temperature and humidity are considered against a prescribed thermal comfort envelope such as from ASHRAE Standard 55. In alternative embodiments, any of the system controller 442 and zone temperature sensors 444, 446 may comprise a sensor configured to detect any environmental variable or matter which may be redistributed through circulating air.

During operation, the system controller 442 monitors the temperature in zone 402 and monitors the zone temperature sensors 444, 446 to determine if the air temperature in any zone 402, 404, and 406 is above the selected global temperature threshold (when operating in a cooling mode). If the temperature of any zone 402, 404, and 406 is above the selected global temperature threshold, the system controller 442 calculates the weighted average temperature to determine if the "FAN ONLY" mode may be employed to bring the unbalanced zone into conformance with the selected global temperature threshold. For example, with a selected global temperature threshold of 73 degrees, if the air in zones 402, 404, and 406 has temperatures of 75 degrees, 72 degrees, and 70 degrees, respectively, with weighting factors of 50%, 20%, and 30%, respectively, the system controller 442 would be alerted that first zone 402 has exceeded the selected global temperature threshold. The system controller 442 would calculate the weighted average temperature for zones 402, 404, and 406 by multiplying the weighting factor by the respective temperature $(75(0.5)+72(0.2)+70(0.3))$ to achieve a weighted average temperature of 72.9 degrees.

Since the weighted average temperature falls below the selected global temperature threshold, the system controller 442 may employ the "FAN ONLY" mode to mix the air of zones 402, 404, and 406 to bring the unbalanced zone into conformance with the selected global temperature threshold of 73 degrees in a manner substantially similar to that of control system 300 in FIG. 3.

In alternative embodiments, the system controller 442 may also be configured to operate the "FAN ONLY" mode by mixing air between less than all of zones 402, 404, and 406 to bring an unbalanced room into conformance with the selected global temperature threshold. To achieve selective zone mixing, the system controller 442 may be configured to control return zone dampers 422, 424, and 426 associated with zones 402, 404, and 406, respectively. Alternatively or in conjunction with the control of the return zone dampers 422, 424, and 426, in some embodiments, the system controller 442 may also control respective zone dampers 440 to prevent mixing in selected zones. For example, where zones 402, 404, and 406 have air temperatures of 74 degrees, 72 degrees, and 70 degrees Fahrenheit, respectively, it may prove beneficial to mix only the air of the first zone 402 and third zone 406. In some embodiments, the system controller 442 may calculate the weighted average temperature of the unbalanced first zone 402 with the other two zones 404 and 406 to determine if less than all of the zones 402, 404, and 406 may be employed in the "FAN ONLY" mode. For example, the system controller 442 may determine the weighted average temperature of the first zone 402 and the third zone 406 using algorithm $(74(0.5)+70(0.3))/(0.5+0.3)$, resulting in 72.5 degrees, and the weighted average temperature of the first zone 402 and the second zone 404 using algorithm $(74(0.5)+72(0.2))/(0.5+0.2)$, resulting in 73.4 degrees. Accordingly, the system controller 442 may be configured to determine that zone 402 and zone 406 may be employed in the "FAN ONLY" mode to mix the air in these zones, thereby bringing the unbalanced zone into conformance with the selected global temperature threshold, whereas zone 402 and 406 may not be employed in the "FAN ONLY" mode. In this situation, the system controller 442 may then at least partially close the return damper 424 of the second zone 404 to reduce mixing of the second zone 404, thereby only mixing the air from first zone 402 and third zone 406.

In situations where the system controller 442 determines that the weighted average temperature of all of the zones 402, 404, and 406 or that the weighted average temperature of the unbalanced zone with any of the remaining zones is above the selected global temperature threshold such that the "FAN ONLY" mode may not be employed to mix air between any of the zones to bring the unbalanced zone into conformance with the selected global temperature threshold, it may be necessary to initiate cooling in a manner substantially similar to that described for control system 300 in FIG. 3.

It will be appreciated that although embodiments and examples are provided in the context of cooling, the control system 400 may also be configured to operate in a heating mode in a manner substantially similar to control system 300 in FIG. 3. Additionally, the control system 400 may also be configured to operate in an "AUTO" mode substantially similar to control system 300, which allows a user to select two global temperature thresholds via the system controller 442 and/or the zone temperature sensors 442, 444, in which one is set for a cooling mode and one is set for a heating mode. In some embodiments, a system controller 442 operating in an "AUTO" mode may be configured to apply different weighting factors to each zone 402, 404, and 406 for the different selected global temperature thresholds set for the respective cooling and heating modes. It will further be appreciated that the system controller 442, in some embodiments, may also employ a trigger threshold substantially similar to the trigger threshold described in control system 300 in FIG. 3.

In some embodiments, while the system controller 442 may generally be configured to control the temperature of zones 402, 404, and 406 to alternate selected global temperature thresholds based on a configurable schedule, the various weighting factors of each zone 402, 404, and 406 may also be selectively controlled based on a configurable schedule. For example, the control system 400 may generally configure zones 402, 404, and 406 based on weighting factors of 50%, 20%, and 30% respectively. However, zones 402, 404, and 406 may be configured to have weighting factors of 70%, 10%, and 30%, respectively, between the hours of 8 a.m. to 5 p.m. In some embodiments, the system controller 442 may generally apply a higher weighting factor to zones that have higher solar loading profiles during the daytime hours and/or apply a very small weighting factor to unoccupied bedrooms. In other embodiments, the system controller 442 may also be configured to only run a particular schedule on certain days, i.e. only Monday through Friday. In yet other embodiments, the system controller 442 may be configured to ignore the temperature in any of the zones 402, 404, and 406 during certain times of the day or week, effectively giving a zone a weighting factor of 0%. It should be noted that a room given a weighting factor of 0% can be ignored in terms of needing to mix the air in that particular zone; however, in systems without dampers, the temperature in that room must still be accounted for in determining the final mixed temperature. In alternative embodiments, the system controller 442 may also be configured to run a particular program which assigns a higher weighting factor to occupied zones, the occupancy of which may be detectable using any of motion, light, radio frequency, and/or heat detection sensors that may be present within the system controller 442 and/or the zone temperature sensors 444, 446. It will also be appreciated that any series of various global temperature thresholds and various weighting factors may be selectively programmed into the system controller 442 in order to provide a highly customizable system controller 442 to achieve desired comfort levels and energy efficiency of the control system 400.

Figure 5:
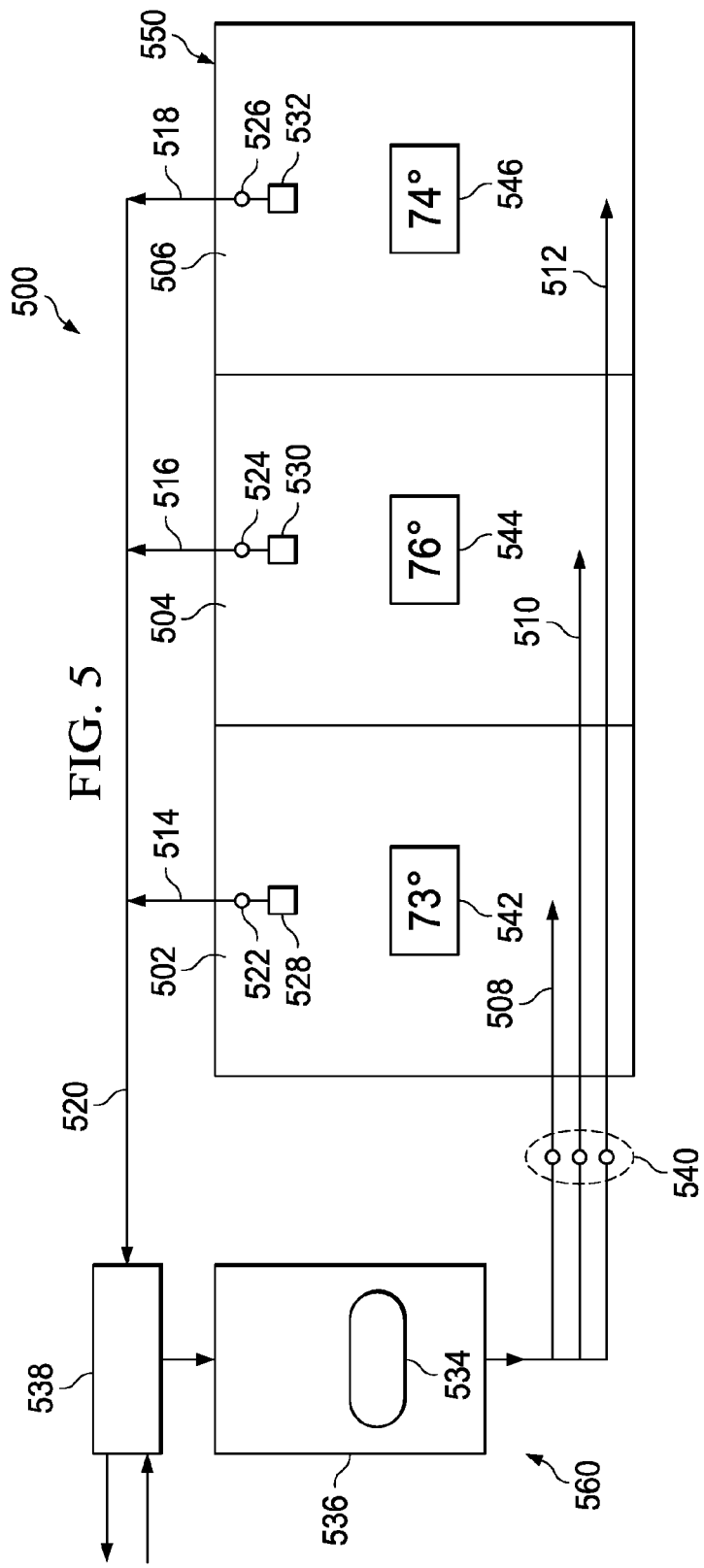
FIG. 5 is a simplified schematic of a control system comprising a selected individual temperature threshold for each zone according to an embodiment of the disclosure.

Referring now to FIG. 5, a simplified schematic of a control system 500 comprising a selected individual temperature threshold for each zone 502, 504, and 506 is shown according to an embodiment of the disclosure. It should be noted that control system 500 is substantially similar to control system 300 in FIG. 3. Control system 500 comprises a structure 550 and an HVAC system 560. It will be appreciated that structure 550 is substantially similar to structure 350 in FIG. 3. Structure 550 comprises a first zone 502, a second zone 504, and a third zone 506. It will also be appreciated that HVAC system 560 is substantially similar to HVAC system 360 in FIG. 3. HVAC system 560 comprises a first zone supply duct 508, a second zone supply duct 510, a third zone supply duct 512, a first zone return duct 514, a second zone return duct 516, a third zone return duct 518, a return plenum 520, a first zone return damper 522, a second zone return damper 524, a third zone return damper 526, a first zone return fan 528, a second zone return fan 530, a third zone return fan 532, an indoor fan 534, an indoor unit 536, a ventilator 538, zone dampers 540, a system controller 542, second zone temperature sensor 544, and third zone temperature sensor 546. It will also be appreciated that the operation of control system 500 is substantially similar to the operation of control system 300 in FIG. 3. However, control system 500 may generally be configured to provide different selectable temperature thresholds for each zone 502, 504, and 506 that the system controller 542 utilizes to determine if the "FAN ONLY" mode may be employed to better equalize temperatures and/or bring an unbalanced zone into conformance with the selected global temperature threshold.

In some embodiments, control system 500 may generally be controlled based on selected individual temperature thresholds for each zone 502, 504, and 506. For example, zones 502, 504, and 506 may generally comprise selected individual temperature thresholds of 73 degrees, 76 degrees, and 74 degrees Fahrenheit, respectively, in a selectable cooling mode. However, instead of utilizing an average temperature of the zones to be mixed and comparing it to a selected global temperature threshold as in control system 300 in FIG. 3, the average temperature of the zones to be mixed is compared to the selected individual temperature threshold of the unbalanced zone to determine whether mixing air using the "FAN ONLY" mode may bring the unbalanced zone into conformance with that particular zone's selected individual temperature threshold.

In some embodiments, the individual temperature thresholds of each zone 502, 504, and 506 may generally be selected and/or adjusted through any of the zone temperature sensors 544, 546 in addition to the system controller 542. Additionally, in some embodiments, each system controller 542 and/or zone temperature sensor 544, 546 may display the respective temperature of the zone in which the component is located. In addition, each system controller 542 and/or zone temperature sensor 544, 546 may also display the individual selected temperature threshold associated with the respective zone in which it is located. It will also be appreciated that any of the system controller 542 or zone temperature sensors 544, 546 may be interchanged with one another or may comprise a zone thermostat 158, and the disclosure should not be limited to any one embodiment or configuration. Furthermore, it will be appreciated that in some embodiments, any of the system controller 542 and zone temperature sensors 544, 546 may comprise a humidity sensor. In other embodiments, any of the system controller 542 and zone temperature sensors 544, 546 may comprise a mixture of temperature sensors and humidity sensors, where both temperature and humidity are considered against a prescribed thermal comfort envelope such as from ASHRAE Standard 55. In alternative embodiments, any of the system controller 542 and zone temperature sensors 544, 546 may comprise a sensor configured to detect any environmental factor or matter which may be redistributed through circulating air.

During operation, the system controller 542 monitors the temperature in zone 502 and monitors the zone temperature sensors 544, 546 to determine if the temperature of any zone 502, 504, and 506 is above the selected individual temperature threshold for that particular zone (when operating in a cooling mode). If one zone's temperature is above the selected individual temperature threshold for that particular zone, the system controller 542 determines the average temperature of the zones to be mixed to determine if the "FAN ONLY" mode may be employed to bring the unbalanced zone's temperature back into conformance with the selected individual temperature threshold for that zone. For example, if zones 502, 504, and 506 have selected individual temperature thresholds of 73 degrees, 76 degrees, and 74 degrees, respectively, and temperatures of 75 degrees, 72 degrees, and 70 degrees, respectively, the system controller 542 would be alerted that first zone 502 has exceeded its selected individual temperature threshold (here, 73 degrees). The system controller 542 would then calculate the average temperature of zones 502, 504, and 506, which equals 72.33 degrees Fahrenheit. Since the average temperature of all zones 502, 504, and 506 is below the selected individual temperature threshold of 73 degrees for the unbalanced first zone 502, the system controller 542 may be configured to employ the "FAN ONLY" mode to mix the air of zones 502, 504, and 506 to bring the unbalanced first zone 502 into conformance with its selected individual temperature threshold of 73 degrees in any manner substantially similar to that in control system 300 in FIG. 3.

In alternative embodiments, the system controller 542 may also be configured to operate the "FAN ONLY" mode by mixing air between less than all of zones 502, 504, and 506 to bring an unbalanced zone's temperature into conformance with that zone's selected individual temperature threshold in a manner substantially similar to that of control system 300 in FIG. 3. In this situation, the average temperature of the zones to be balanced will be averaged and compared to the selected individual temperature threshold of the unbalanced zone to determine if the "FAN ONLY" mode may be employed to bring the unbalanced zone into conformance with the unbalanced zone's selected individual temperature threshold. To achieve selective zone mixing, in some embodiments, the system controller 542 may be configured to control return zone dampers 522, 524, and 526 associated with zones 502, 504, and 506, respectively. Alternatively or in conjunction with the control of the return zone dampers 522, 524, and 526, in some embodiments, the system controller 542 may also control respective zone dampers 540 to reduce and/or prevent mixing in selected zones.

In situations where the system controller 542 determines that the average temperature of all of the zones 502, 504, and 506 or that the average temperature of the unbalanced zone with any of the remaining zones is above the selected individual temperature threshold for the unbalanced zone such that the "FAN ONLY" mode may not be employed to mix air between any of the zones 502, 504, and 506 to bring the unbalanced zone's temperature into conformance with its selected individual temperature threshold, it may be necessary to initiate cooling, which may be employed in a manner substantially similar to that disclosed for control system 300 in FIG. 3.

It will be appreciated that although embodiments and examples are provided in the context of cooling, the control system 500 may also be configured to operate in a heating mode in a manner substantially similar to control system 300 in FIG. 3. Additionally, the control system 500 may also be configured to operate in an "AUTO" mode substantially similar to control system 300 in FIG. 3. However, in an "AUTO" mode, two selected individual temperature thresholds for each zone 502, 504, and 506 may be selected, in which one selected individual temperature threshold is set for a cooling mode and one selected individual temperature threshold is set for a heating mode. It will further be appreciated that the system controller 542, in some embodiments, may also employ a trigger threshold substantially similar to the trigger threshold described in control system 300 in FIG. 3.

In some embodiments, the system controller 542 may generally be configured to control the temperature of zones 502, 504, and 506 to alternate selected individual temperature thresholds based on a configurable schedule. For example, the control system 500 may generally configure zones 502, 504, and 506 based on selected individual temperature thresholds for each zone 502, 504, and 506 of 73 degrees, 76 degrees, and 74 degrees, respectively. However, zones 502, 504, and 506 may be configured to have different selected individual temperature thresholds of 76 degrees, 78 degrees, and 74 degrees, respectively between the hours of 8 a.m. to 5 p.m. A configuration such as this, may allow the system controller 542 to control various zones to a higher selected individual temperature threshold to account for factors including, but not limited to, the solar loading profiles of a particular zones, the thermal load present in particular zones, and/or the occupancy level of particular zones. In other embodiments, the system controller 542 may also be configured to only run a particular schedule on certain days, i.e. only Monday through Friday. In yet other embodiments, the system controller 542 may be configured to ignore the temperature in any of the zones 502, 504, and 506 during certain times of the day or week. In alternative embodiments, the system controller 542 may also be configured to run a particular program which assigns a lower or higher selected individual temperature threshold to occupied zones based on the personal preferences of the occupant. In some embodiments, the system controller 542 and/or the zone temperature sensors 544, 546 may comprise an override feature which allows an occupant to alter the selected individual temperature threshold for any one zone. In other embodiments, the system controller 542 and/or the zone temperature sensors 544, 546 may automatically adjust the selected individual temperature threshold for occupied zones 502, 504, and 506, the occupancy of which may be detectable using any of motion, light, radio frequency, and/or heat detection sensors. It will also be appreciated that any series of various selected individual temperature thresholds may be selectively programmed into the system controller 542 in order to provide a highly customizable control system 500 and achieve desired comfort levels and energy efficiency.

Figure 6:
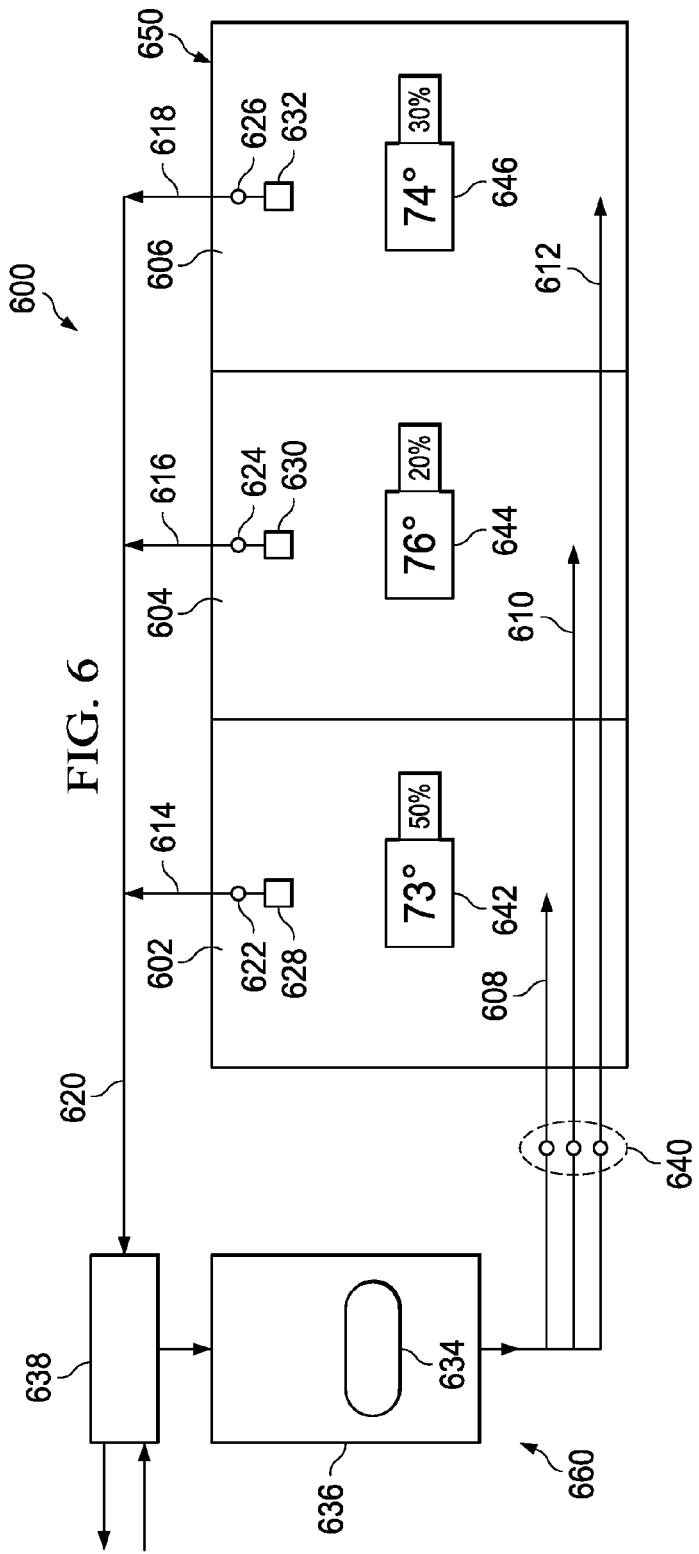
FIG. 6 is a simplified schematic of a control system comprising selected individual temperature thresholds and various weighting factors for each zone according to an embodiment of the disclosure.

Referring now to FIG. 6, a simplified schematic of a control system 600 comprising selected individual temperature thresholds and various weighting factors for each zone 602, 604, and 606 is shown according to an embodiment of the disclosure. It should be noted that control system 600 is substantially similar to control system 500 in FIG. 5. Control system 600 comprises a structure 650 and an HVAC system 660. It will be appreciated that structure 650 is substantially similar to structure 550 in FIG. 5. Structure 650 comprises a first zone 602, a second zone 604, and a third zone 606. It will also be appreciated that HVAC system 660 is substantially similar to HVAC system 560 in FIG. 5. HVAC system 660 comprises a first zone supply duct 608, a second zone supply duct 610, a third zone supply duct 612, a first zone return duct 614, a second zone return duct 616, a third zone return duct 618, a return plenum 620, a first zone return damper 622, a second zone return damper 624, a third zone return damper 626, a first zone return fan 628, a second zone return fan 630, a third zone return fan 632, an indoor fan 634, an indoor unit 636, a ventilator 638, zone dampers 640, a system controller 642, second zone temperature sensor 644, and third zone temperature sensor 646. It will also be appreciated that the operation of control system 600 is substantially similar to the operation of control system 400 in FIG. 4 and control system 500 in FIG. 5 in that control system 600 may generally be configured to provide a different selected individual temperature threshold for each zone 602, 604, and 606 as in control system 500 in FIG. 5 in addition to a different selectable weighting factor for each zone 602, 604, and 606 as in control system 400 in FIG. 4 that the system controller 642 utilizes to determine if the "FAN ONLY" mode may be employed to better equalize temperatures and/or bring an unbalanced zone into conformance with the selected global temperature threshold.

In some embodiments, control system 600 may generally be controlled based on selected individual temperature thresholds in addition to various weighting factors for each zone 602, 604, and 606. For example, zones 602, 604, and 606 may generally comprise selected individual temperature thresholds of 73 degrees, 76 degrees, and 74 degrees Fahrenheit, respectively, and various weighting factors of 50%, 20%, and 30%, respectively, when operated in a selectable cooling mode. In some embodiments, the selected individual temperature thresholds and various weighting factors applied to each zone 602, 604, and 606 may be customized based on the individual characteristics of each zone, including, but not limited to, each zone's volume, the thermal load present within a particular zone, and/or a matter of preference by the occupants. In other embodiments, the weighting factors however may be built into the system controller 642 based on the characteristics of the control system 600.

In some embodiments, the selected individual temperature thresholds and various weighting factors of the control system 600 may generally be selected and/or adjusted through any of the zone temperature sensors 644, 646 in addition to the system controller 642. Additionally, in some embodiments, each system controller 642 and/or zone temperature sensor 644, 646 may display the respective temperature of the zone in which the component is located. Each system controller 642 and/or zone temperature sensor 644, 646 may also display the selected individual temperature threshold associated with each respective zone 602, 604, and 606. In some embodiments, each system controller 642 and/or zone temperature sensor 644, 646 may also be configured to display the selected individual temperature thresholds and/or various weighting factors of any of the zones 602, 604, and 606. It will also be appreciated by one of ordinary skill in the art that any of the system controller 642 or zone temperature sensors 644, 646 may be interchanged with one another or may comprise a zone thermostat 158, and the disclosure should not be limited to any one embodiment or configuration. Furthermore, it will be appreciated that in some embodiments, any of the system controller 642 and zone temperature sensors 644, 646 may comprise a humidity sensor. In other embodiments, any of the system controller 642 and zone temperature sensors 644, 646 may comprise a mixture of temperature sensors and humidity sensors, where both temperature and humidity are considered against a prescribed thermal comfort envelope such as from ASHRAE Standard 55. In alternative embodiments, any of the system controller 642 and zone temperature sensors 644, 646 may comprise a sensor configured to detect any environmental variable or matter which may be redistributed through circulating air.

During operation, the system controller 642 monitors the temperature in zone 602 and monitors the zone temperature sensors 644, 646 to determine if the temperature of any zone 602, 604, and 606 is above the selected individual temperature threshold for that particular zone (when operating in a cooling mode). If any zone's temperature is above the selected individual temperature threshold for that particular zone, the system controller 642 determines the weighted average temperature of the zones 602, 604, and 606 to be mixed to determine if the "FAN ONLY" mode may be employed to bring the unbalanced zone's temperature into conformance with the selected individual temperature threshold for that zone. For example, if zones 602, 604, and 606 have selected individual temperature thresholds of 73 degrees, 76 degrees, and 74 degrees, respectively, and various weighting factors of 50%, 20%, and 30%, respectively, with air temperatures of 71 degrees, 77 degrees, and 72 degrees, respectively, the system controller 642 would be alerted that second zone 604 has exceeded its selected individual temperature threshold. The system controller 642 calculates the weighted average temperature of zones 602, 604, and 606, in a manner substantially similar to system controller 442 in FIG. 4, by multiplying the weighting factor of each zone by that zone's respective temperature (71(0.5)+ 77(0.2)+72(0.3)) to yield a weighted average temperature of 72.59 degrees. Since the weighted average temperature of 72.59 degrees is below the selected individual temperature threshold of 76 degrees of the unbalanced second zone 604, the system controller 642 may employ the "FAN ONLY" mode to mix the air of zones 602, 604, and 606 to bring the unbalanced second zone 604 into conformance with the individual temperature threshold of 76 degrees in a manner substantially similar to that in control system 500 in FIG. 5.

In alternative embodiments, the system controller 642 may also be configured to operate the "FAN ONLY" mode by mixing air between less than all of zones 602, 604, and 606 to bring an unbalanced zone's temperature within that zone's selected individual temperature threshold in a manner substantially similar to that of control system 500 in FIG. 5. To achieve selective zone mixing, the system controller 642 may generally be configured to calculate the weighted average temperature of selected zones to be mixed using an algorithm similar to that of controller 442 in FIG. 4. The system controller 642 may also be configured to control return zone dampers 622, 624, and 626 associated with zones 602, 604, and 606, respectively, in order to reduce and/or prevent air flow mixing between certain zones 602, 604, and 606. Alternatively or in conjunction with the control of the return zone dampers 622, 624, and 626, in some embodiments, the system controller 642 may also control respective zone dampers 640 to reduce and/or prevent mixing in selected zones.

In situations where the system controller 642 determines that the weighted average temperature of all of the zones 602, 604, and 606 or that the weighted average temperature of the unbalanced zone with any of the remaining zones is above the selected individual temperature threshold for the unbalanced zone such that the "FAN ONLY" mode may not be employed to mix air between any of the zones 602, 604, and 606 to bring the unbalanced zone below its selected individual temperature threshold, it may be necessary to initiate cooling, which may be employed in a manner substantially similar to that described for control system 500 in FIG. 5.

It will be appreciated that although embodiments and examples are provided in the context of cooling, the control system 600 may also be configured to operate in a heating mode in a manner substantially similar to control system 500 in FIG. 5. Additionally, the control system 600 may also be configured to operate in an "AUTO" mode substantially similar to control system 500 in FIG. 5, which allows a user to select two individual temperature thresholds for each zone 602, 604, and 606 via the system controller 642, in which one individual temperature threshold is set for a cooling mode and one individual temperature threshold is set for a heating mode for each zone 602, 604, and 606. It will further be appreciated that the system controller 642, in some embodiments, may also employ a trigger threshold substantially similar to the trigger threshold described in control system 300 in FIG. 3.

In some embodiments, the system controller 642 may generally be selectively configured to associate alternate selected individual temperature thresholds and/or different weighting factors of each zone 602, 604, and 606 according to a programmable schedule that is configurable by the user. Accordingly, in some embodiments, the system controller 642 may be configured to alter the individual weighting factors of each zone 602, 604, and 606 based on a configurable schedule as in any of the embodiments of control system 400 in FIG. 4. Additionally, the system controller 642 may be configured to alter the selected individual temperature thresholds of each zone 602, 604, and 606 based on a configurable schedule as in any of the embodiments of control system 500 in FIG. 5. Accordingly, it will also be appreciated that any series of various selected individual temperature thresholds and various weighting factors may be selectively programmed into the system controller 642 in order to provide a highly customizable system controller 642 to achieve desired comfort levels and energy efficiency of the control system 600.

It should be noted that in any of the aforementioned embodiments, any of the disclosed systems and/or methods (average, weighted average, threshold) could be used by simply substituting a different environmental metric than measured temperature. Using this alternative methodology, a comfort or heat metric may be compared to a defined threshold requirement rather than the temperature threshold. In some embodiments, the alternative metric may comprise enthalpy. While an exact calculation of enthalpy from temperature and relative humidity may not be used because of a dependency on barometric pressure, calculation of an approximation of enthalpy may be utilized. One approximation from the 2001 ASHRAE Handbook is $H=0.24T+(1061+0.444T)*Rh*Ws$ where T is temperature in degrees Fahrenheit, Rh is relative humidity, and Ws is the specific humidity in pounds of water per pound of dry air which can be estimated for standard condition or calculated at actual conditions. In other embodiments, determining an environmental metric may comprise a calculated dew point. In yet other embodiments, the environmental metric may comprise a temperature-humidity index, a heat index, an effective temperature, and/or a summer simmer index.

Figure 7:
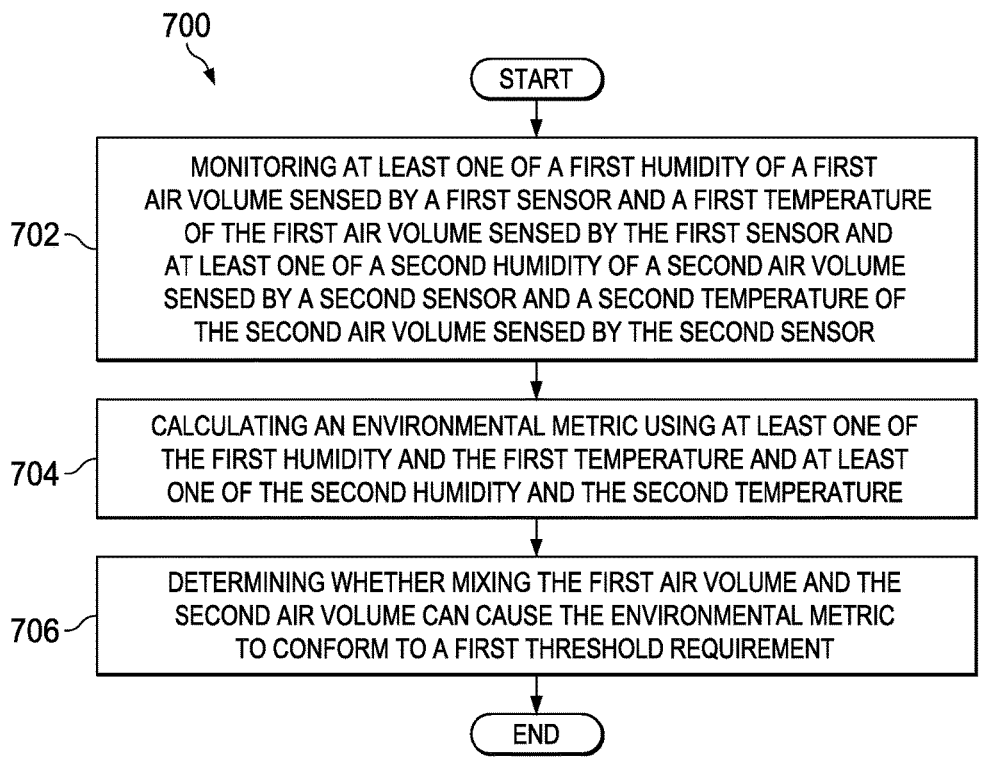
FIG. 7 is a flowchart of a method of operating an HVAC system according to an embodiment of the disclosure.

Referring now to FIG. 7, a method 700 of operating an HVAC system is disclosed. Method 700 may begin at block 702 with monitoring at least one of a first humidity of a first air volume sensed by a first sensor and a first temperature of the first air volume sensed by the first sensor and at least one of a second humidity of a second air volume sensed by a second sensor and a second temperature of the second air volume sensed by the second sensor. Method 700 may continue at block 704 with calculating an environmental metric using at least one of the first humidity and the first temperature and at least one of the second humidity and the second temperature. Method 700 may conclude at block 706 with determining whether mixing the first air volume and the second air volume can cause the environmental metric to conform to a first threshold requirement.

Figure 8:
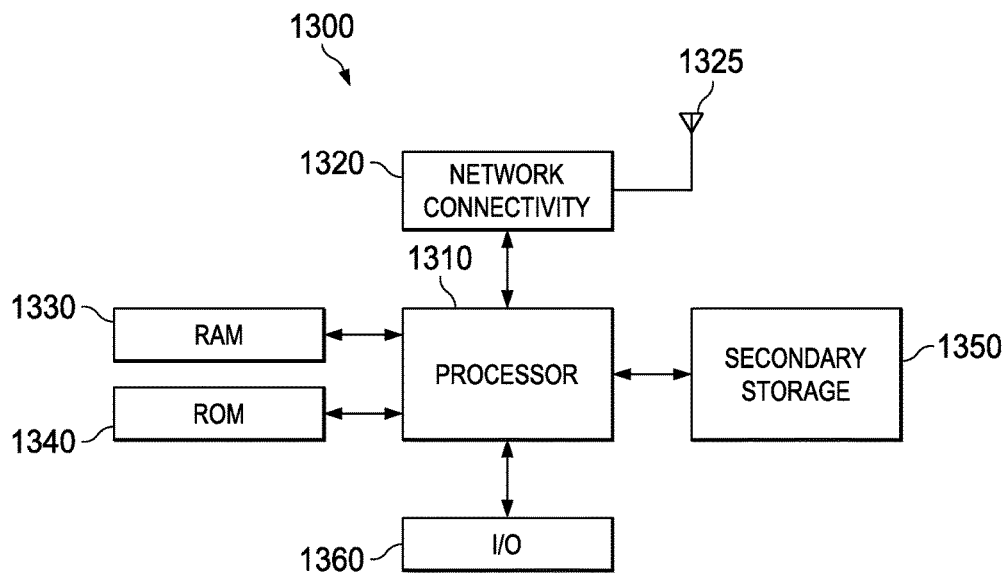
FIG. 8 is a simplified schematic diagram of a general purpose processor or computer that may be used to implement one or more of the embodiments of the disclosure.

FIG. 8 illustrates a typical, general-purpose processor (e.g., electronic controller or computer) system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, optical disk, or other drive). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver.

Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs or instructions that are loaded into RAM 1330 when such programs are selected for execution or information is needed.

The I/O devices 1360 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 1325 might be considered to be a component of the I/O devices 1360 instead of or in addition to being a component of the network connectivity devices 1320. Some or all of the I/O devices 1360 may be substantially similar to various components disclosed herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A system controller for a heating, ventilation, and/or air conditioning (HVAC) system, comprising:
   a user interface configured to receive an input of a threshold requirement;
   at least one processor configured to:

receive sensor information related to humidity and a temperature for each of a plurality of zones for a time period;

determine whether an unbalanced zone exists in any of the plurality of zones in response to determining that at least one of the humidity and temperature in any of the plurality of zones exceeds the threshold requirement;

calculate an environmental metric, wherein the calculated environmental metric comprises at least one of an average of the temperatures and humidities;

determine, in response to comparing the environmental metric to the threshold requirement, whether mixing air of a first selective number of zones of the plurality of zones to create first mixed air causes the unbalanced zone to conform to the threshold requirement for a first time period of operating an indoor fan or whether mixing air of a second selective number of zones of the plurality of zones to create second mixed air causes the unbalanced zone to conform to the threshold requirement for a second time period of operating the indoor fan, wherein the first selective number of zones comprises at least one zone that is different than a zone in the second selective number of zones, wherein the first time period is different than the second time period, and wherein the processor is configured to determine that mixing the air of the first or the second selective number of zones causes the unbalanced zone to conform to the threshold requirement when the calculated environmental metric is lower than the threshold requirement;

select either the first selective number of zones or the second selective number of zones based on operating the indoor fan for a lower time period between the first time period and the second time period;

operate the indoor fan associated with an indoor unit of the HVAC to cause the indoor fan to mix air between the first selective number of zones or the second selective number of zones by drawing return air from the first selective number of zones or the second selective number of zones via zone return ducts and selectively deliver at least a portion of the mixed air to the unbalanced zone to bring the unbalanced zone into conformance with the threshold requirement; and selectively initiate operation of the HVAC system in a cooling mode to provide temperature conditioned air to each zone of the plurality of zones when the unbalanced zone fails to conform to the threshold requirement after operating the indoor fan to mix air between the first selective number of zones or the second selective number of zones for a specified time period.

2. The system controller of claim 1, wherein the calculated environmental metric comprises a calculated enthalpy.

3. The system controller of claim 2, wherein the processor is configured to determine whether at least one of (1) the average of the humidities, (2) the average of the temperatures, and (3) the calculated enthalpy conform to the threshold requirement during the first time period, and wherein the processor is configured to determine whether at least one of (1) the average of the humidities, (2) the average of the temperatures, and (3) the calculated enthalpy conform to the threshold requirement during the second time period.

4. The system controller of claim 1, wherein a first weighting factor and wherein a second weighting factor is associated with a sensor.

5. The system controller of claim 1, wherein the threshold requirement is associated a sensor.

6. The system controller of claim 1, wherein a first weighting factor is associated with a sensor, wherein a second weighting factor is associated with the sensor, and wherein the threshold requirement is associated with the sensor.

7. The system controller of claim 1, wherein the controller is configured to (1) associate a first weighting factor with the sensor and a second weighting factor with the sensor during the first time period and (2) associate a first alternate weighting factor with the sensor and a second alternate weighting factor with the sensor during the second time period.

8. A heating, ventilation, and/or air conditioning (HVAC) system, comprising:

a system controller comprising a user interface configured to receive an input of a threshold requirement;

a sensor configured to sense at least one of a humidity and a temperature for each of a plurality of zones for a time period; and wherein the system controller is configured to:

receive sensor information from the sensor;

determine whether an unbalanced zone exists in any of the plurality of zones in response to determining that at least one of the humidity and the temperature in any of the plurality of zones exceeds the threshold requirement;

calculate an environmental metric, wherein the calculated environmental metric comprises at least one of an average of the temperatures and an average of the humidities;

determine, in response to comparing the environmental metric to the threshold requirement, whether mixing air of a first selective number of zones of the plurality of zones to create first mixed air causes the unbalanced zone to conform to the threshold requirement for a first time period of operating an indoor fan or whether mixing air of a second selective number of zones of the plurality of zones to create second mixed air causes the unbalanced zone to conform to the threshold requirement for a second time period of operating the indoor fan, wherein the first selective number of zones comprises at least one zone that is different than a zone in the second selective number of zones, wherein the first time period is different than the second time period, and wherein the system controller is configured to determine that mixing the air of the first or the second selective number of zones causes the unbalanced zone to conform to the threshold requirement when the calculated environmental metric is lower than the threshold requirement;

select either the first selective number of zones or the second selective number of zones based on operating an indoor fan for a lower time period between the first time period and the second time period;

operate the indoor fan associated with an indoor unit of the HVAC system to cause the indoor fan to mix air between the first selective number of zones or the second selective number of zones by drawing return air from the first selective number of zones or the second selective number of zones via zone return ducts, and selectively deliver at least a portion of the mixed air to the unbalanced zone to bring the unbalanced zone into conformance with the threshold requirement; and selectively initiate operation of the HVAC system in a cooling mode to provide temperature conditioned air to each zone of the plurality of zones when the unbalanced zone fails to conform to the threshold requirement after operating the indoor fan to mix air between the first selective number of zones or the second selective number of zones for a specified time period.

9. The HVAC system of claim 8, wherein the calculated environmental metric comprises a calculated enthalpy.

10. The HVAC system of claim 9, wherein the system controller is configured to determine whether at least one of (1) the average of the humidities, (2) the average of the temperatures, and (3) the calculated enthalpy conform to the threshold value during the first time period, and wherein the processor is configured to determine whether at least one of (1) the average of the humidities, (2) the average of the temperatures, and (3) the calculated enthalpy conform to the threshold during the second time period.

11. The HVAC system of claim 8, wherein a first weighting factor is associated with the sensor, and wherein a second weighting factor is associated with the sensor.

12. The HVAC system of claim 8, wherein the threshold requirement is associated with the sensor.

13. The HVAC system of claim 8, wherein a first weighting factor is associated with the sensor, wherein a second weighting factor is associated with the sensor, and wherein the threshold requirement is associated with the sensor.

14. The HVAC system of claim 13, further comprising a first damper and a second damper, wherein the first damper and the second damper is associated with the plurality of zones, and wherein the system controller is configured to selectively operate the first damper and the second damper.

15. The HVAC system of claim 8, wherein the controller is configured to (1) associate a first weighting factor with the sensor and a second weighting factor with the sensor during the first time period and (2) associate a first alternate weighting factor with the sensor and a second alternate weighting factor with the sensor during the second time period.

16. The HVAC system of claim 8, wherein the first threshold requirement is entered into the system controller through the sensor.

17. A method of operating a heating ventilation and/or air conditioning (HVAC) system, comprising:
inputting a threshold requirement for a first time period and a second time period into at least one of a system controller, and a sensor, wherein the first time period is distinct from the second time period;
receiving sensor information related to a humidity and a temperature of a plurality of zones sensed by the sensor, wherein the sensor information is received for a time period associated with either the first time period or the second time period;
determining whether an unbalanced zone exists in any of the plurality of zones in response to determining that at least one of the humidity and temperature exceeds the threshold requirement;
calculating an environmental metric using at least one of an average of the humidities and an average of the temperatures; and
determining, in response to comparing the environmental metric to the threshold requirement, whether mixing air of a first selective number of zones to create first mixed air causes the unbalanced zone to conform to the threshold requirement for a first time period of operating an indoor fan or whether mixing air of a second selective number of zones of the plurality of zones to create second mixed air causes the unbalanced zone to conform to the threshold requirement for the second time period of operating the indoor fan, wherein the first selective number of zones comprises at least one zone that is different than a zone in the second selective number of zones, wherein the first time period is different than the second time period, and wherein the system controller is configured to determine that mixing the air of the first or the second selective number of zones causes the unbalanced zone to conform to the threshold requirement when the calculated environmental metric is lower than the threshold requirement;
selecting either first selective number of zones or the second selective number of zones based on operating the indoor fan for a lower time period between the first time period and the second time period
operating the indoor fan associated with an indoor unit of the HVAC to cause the indoor fan to mix air between the first selective number of zones and the second selective number of zones by drawing return air from each of the first selective number of zones and the second selective number of zones via a first zone return duct and a second zone return duct, respectively, and selectively deliver at least a portion of the mixed air to the unbalanced zone to bring the unbalanced zone into conformance with the threshold requirement; and
selectively initiating operation of the HVAC system in a cooling mode to provide temperature conditioned air to each zone of the plurality of zones when the unbalanced zone fails to conform to the threshold requirement after operating the indoor fan to mix air between the first selective number of zones or the second selective number of zones for a specified time period.

18. The method of operating an HVAC system of claim 17, wherein the environmental metric comprises at least one of (1) an average of the temperatures and the second temperature, (2) an average of the humidities, and (3) a calculated enthalpy.

19. The method of operating an HVAC system of claim 17, wherein a first weighting factor is associated with the sensor, and wherein a second weighting factor is associated with the sensor.

20. A system controller for a heating, ventilation, and/or air conditioning (HVAC) system, comprising:
at least one processor configured to:
receive sensor information related to a first temperature of a first air volume sensed by a sensor and a second temperature of a second air volume sensed by the sensor, wherein the sensor information is received for a time period associated with either a first time period or a second time period;
determine that an unbalanced zone exists when at least one of the first temperature and the second temperature (1) is higher than a threshold requirement when a cooling mode of the HVAC system is selected and (2) is lower than the threshold requirement associated with the sensor information received for the time period associated with either the first time period or the second time period when a heating mode of the HVAC system is selected, wherein the system controller is configured to receive an input of the threshold requirement for the first time period and for the second time period;

calculate an environmental metric, wherein the calculate environmental metric comprises at least one of an average of the temperatures and an average of humidities;

determine, in response to comparing the environmental metric to the threshold requirement, whether mixing air of a first selective number of zones of a plurality of zones to create first mixed air causes the unbalanced zone to conform to the threshold requirement for a first time period of operating an indoor fan or whether mixing air of a second selective number of zones of the plurality of zones to create second mixed air causes the unbalanced zone to conform to the threshold requirement for the second time period of operating the indoor fan, wherein the first selective number of zones comprises at least one zone that is different than a zone in the second selective number of zones, wherein the first time period is different than the second time period, and wherein the processor is configured to determine that mixing the air of the first or the second selective number of zones causes the unbalanced zone to conform to the threshold requirement when the calculated environmental metric is lower than the threshold requirement;

select either the first selective number of zones or the second selective number of zones based on operating the indoor fan for a lower time period between the first time period and the second time period; and operate the indoor fan associated with an indoor unit of the HVAC system in a FAN ONLY mode for a selectable time period to mix at least a portion of the first air volume and at least a portion of the second air volume by drawing the at least a portion of the first air volume from a first zone via a first zone return duct and the at least a portion of the second air volume from a second zone via a second zone return duct to form a mixed volume of air and selectively deliver at least a portion of the mixed volume of air to each of the first zone and the second zone when at least one of the first temperature and the second temperature exceed the threshold requirement and in response to the at least one processor determining that a calculated average of the first temperature and the second temperature is in conformance with the threshold requirement, wherein the calculated average of the first temperature and the second temperature is in conformance with the threshold requirement when the calculated average is lower than the threshold requirement when the cooling mode of the HVAC system is selected, and wherein the calculated average of the first temperature and the second temperature is in conformance with the threshold requirement when the calculated average is greater than the threshold requirement when the heating mode of the HVAC system is selected.

21. The system controller of claim 20, wherein the processor is configured to terminate operation of the indoor fan when the unbalanced zone conforms to the threshold requirement, and wherein the processor is further configured to (1) operate the HVAC system in the cooling mode when the cooling mode of the HVAC system is selected and operating the indoor fan in the FAN ONLY mode does not cause the unbalanced zone to conform to the threshold requirement after the selectable time period and (2) operate the HVAC system in the heating mode when the heating mode of the HVAC system is selected and operating the indoor fan in the FAN ONLY mode does not cause the unbalanced zone to conform to the threshold requirement after the selectable time period.

* * * * *